April 20, 1954  H. L. HAYNES  2,676,219
CIRCUIT BREAKING SAFETY DEVICE FOR
TRACTORS AND LIKE VEHICLES
Filed Aug. 8, 1952
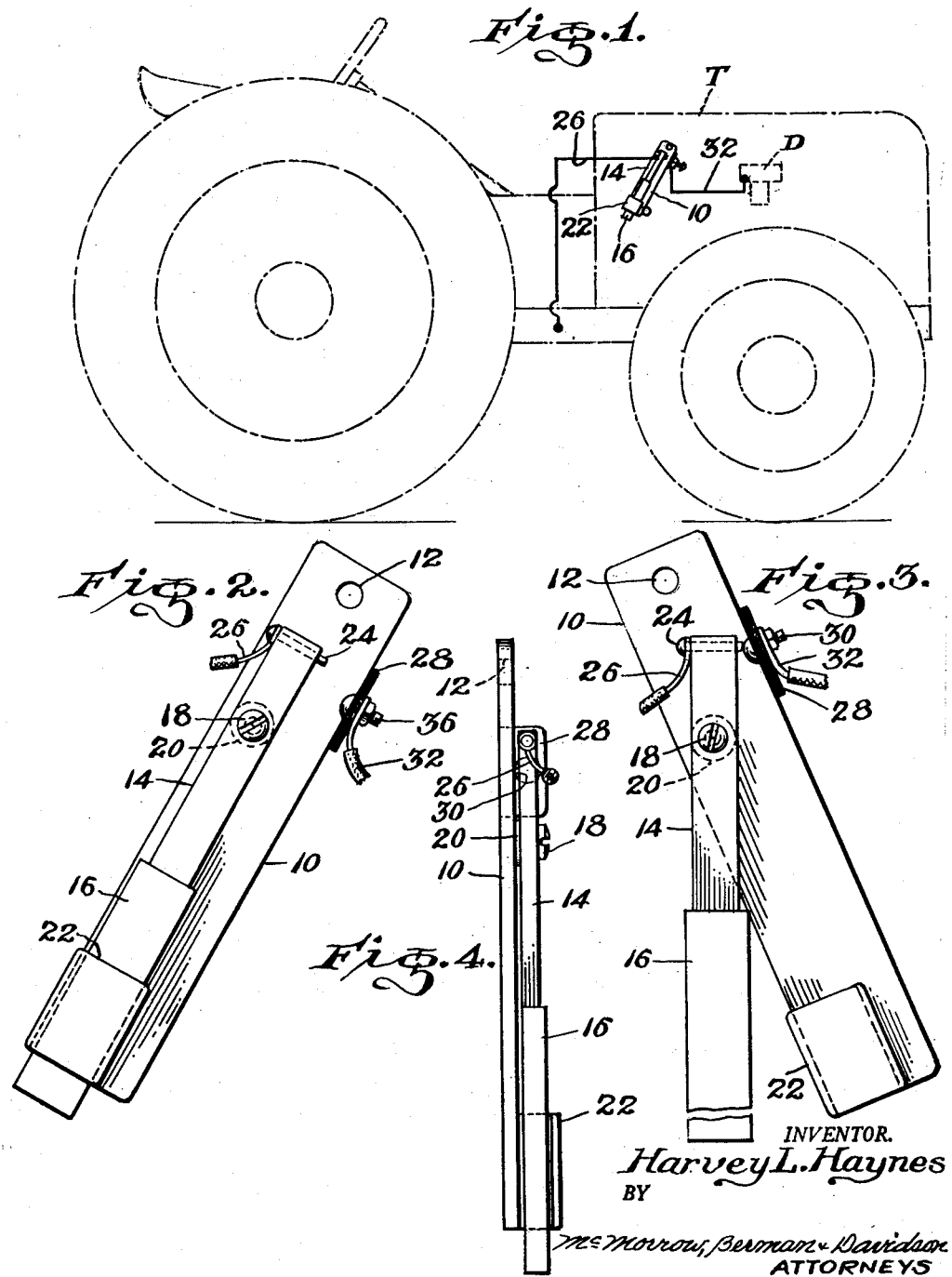
INVENTOR.
Harvey L. Haynes
BY
McMorrow, Berman & Davidson
ATTORNEYS Patented Apr. 20, 1954

2,676,219

UNITED STATES PATENT OFFICE 2,676,219

CIRCUIT BREAKING SAFETY DEVICE FOR TRACTORS AND LIKE VEHICLES

Harvey L. Haynes, Tebbetts, Mo.

Application August 8, 1952, Serial No. 303,375

1 Claim. (Cl. 200—61.51)

This invention relates to safety devices for tractors and similar vehicles. More particularly, the invention has reference to a device adapted to short out the ignition circuit of the vehicle, when the vehicle rears upwardly to a dangerous extent.

It is well known that tractors will, when operating under a heavy load, sometimes rear upwardly and fall over, crushing the tractor operator. In this connection, it has heretofore been proposed to provide safety devices, which will stop operation of the tractor engine under such conditions, thus to cause the tractor to return to a normal, substantially level position before it falls over backwardly.

However, those devices which have heretofore been devised have not, to my knowledge, found favor commercially, and I believe this may be due to the fact that in many instances, the circuit breaking devices have been excessively complicated in construction. In other instances, I believe, accurate and sure operation of the devices has not been assured. In still other instances, the safety devices used have involved too extensive a modification or redesigning of the vehicles associated therewith, or have required undesirable re-wiring of the electrical system of the vehicle.

The broad object of the present invention is to provide a generally improved device of the character referred to, in which none of the disadvantages noted above will be present.

Another object of importance is to provide a safety device as stated which will be capable of installation upon a tractor with maximum speed and ease.

Another object is to provide a circuit breaking device as described which, when installed, will not interfere with normal operation of the vehicle.

Yet another object is to provide a safety device which can be installed at selected, predetermined angles, thus to cause the motor to stop operation when the tractor tilts to a particular angle believed dangerous.

A further object of importance is to provide a circuit breaking, safety device for tractors in which no modification of the tractor or re-wiring of the electrical system thereof is necessary, and in which the device will be simply formed, and readily incorporated in the electrical system.

Still another object is to provide a device of the type stated which will be trouble free in operation, and yet will act efficiently in every instance in which the tractor tilts beyond a predetermined extent.

Other objects will appear from the following description, the claim appended thereto, and from the annexed drawing, in which like reference characters designate like parts throughout the several views, and wherein:

Figure 1 is a somewhat diagrammatic view showing the device as it appears when mounted upon a tractor, said tractor being illustrated in dotted outline;

Figure 2 is an enlarged side elevational view of the device per se;

Figure 3 is a view similar to Figure 2, illustrating the position of the parts when the tractor tilts beyond a selected, predetermined extent; and Figure 4 is an edge elevational view taken from the left of Figure 2.

Referring to the drawings in detail, the reference letter T has been applied to a conventional tractor, having a distributor D. In this connection, the illustrated tractor is of a type in which the electrical system is battery powered, said electrical system including a distributor. In other types of tractors, a magneto is used, and it should be noted at this point that the device constituting the present invention can be applied with equal facility to either of these two types of tractors, without modification or redesigning of the device.

In any event, the circuit breaking safety device includes a relatively elongated, flat support plate 10, said plate being formed at one end with an opening 12 adapted to receive a bolt or other fastening element, whereby the plate 10 can be fixedly secured to a structural part of the tractor T. In this connection, the support plate 10 will generally be mounted at an angle of about 30 degrees, in a position substantially like that shown in Figures 1 or 2.

In any event, the device further includes a pendulum 14 formed from an elongated length of flat bar material, said pendulum having a weight 16 at its lower end. The pendulum 14 is pivotally connected, intermediate its ends, to the support plate 10, and swings in a plane parallel to the plane in which the support plate lies.

To provide for the desired mounting of the pendulum 14, I form in the pendulum, intermediate the opposite ends thereof, an opening receiving a screw or other pivot element 18, said pivot element being threadedly engaged or otherwise attached to the support plate 10, intermediate the opposite ends of the support plate. A washer 20 is interposed between the pendulum and the support plate, as best shown in Figure 4, and spaces the pendulum away from the support plate, thus to assure free swinging movement of the pendulum on its pivot 18.

Rigid with the lower end portion of the support plate 10 is a pendulum rest 22, said rest being of L-shaped or angular formation, so as to define a recess into which the weighted lower end of the pendulum may swing. The pendulum is shown in its rest position in Figure 2, and it will be noted that the rest 22 will limit swinging movement of the pendulum in one direction relative to the support plate.

On the upper end of the pendulum, I provide a conductive terminal 24. Terminal 24 is formed as an elongated pin extending transversely of the pendulum, the head of the pin being disposed beyond one side edge of the pendulum and providing a means for connecting to the pendulum one end of a ground wire 26. The shank of the pin projects beyond the other edge of the pendulum, as best shown in Figure 2 or 3.

The ground wire 26 can be connected to any suitable vehicle ground, such as the frame of the vehicle illustrated in Figure 1.

Secured to the support plate 10 is an ear 28, said ear projecting out of the plane of the support plate, and having an opening receiving a terminal screw 30, said terminal screw being provided with a complementary nut and engaging one end of a lead 32 extending to a ground point of the distributor D of the tractor. If the tractor is of the magneto type, the lead 32 will extend to a ground point of the magneto. In either instance engagement of the terminals 24, 30 with one another will be effective to short out the ignition system of the vehicle, thus to cause immediate stopping of the engine.

From Figure 2, it is seen that when the tractor is substantially level, the support plate 10 will be inclined from the vertical, with the pendulum 14 being extended longitudinally of the support plate in parallel relation to the longitudinal center line of said plate. The pendulum is retained in this position by reason of the engagement of the lower end of the pendulum by the rest 22. In this position of the parts, the terminals 24, 30 are spaced from one another.

The terminals 24, 30, in this connection, are disposed in a plane common to that in which the pendulum 14 swings, this construction being readily noted by reference to Figure 4.

As a result, if the tractor T rears backwardly to a dangerous extent, the support plate 10 will necessarily be shifted to a position such as that shown in Figure 3. The pendulum 14, swinging away from the rest 22, tends to remain vertically disposed, due to the provision of the weight 16 at the lower end thereof. As a result, the terminals 24, 30 will engage one another, and an electrical connection is made between the lead 32 and ground wire 26, causing the ignition system to be shorted out.

This will, in turn, cause the engine to cease operation immediately, and there will no longer be any force tending to cause the tractor to rear, in view of which the tractor will immediately drop back to a normal position before it can fall over backwardly.

It is thought to be an important characteristic of the invention that the support plate 10 can be mounted at any selected angle, thus to cause the device to go into operation when the tractor tilts to a predetermined extent. Normally, there will be no possibility of the device going into operation accidentally, since the terminals 24, 30, will be normally spaced apart at all times when the tractor is not tilted upwardly on its rear wheels to a predetermined, dangerous extent.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A safety switch for attachment to a conventional tractor to arrest the operation of the tractor power plant when the forward end of the tractor attains a predetermined elevation above the rear end thereof, said safety switch comprising an elongated substantially flat base plate having an opening extending therethrough adjacent one end thereof for receiving a fastener by which the plate may be attached to a conventional tractor at a selected angle, a pendulum mounted intermediate its ends on the plate intermediate the ends thereof to oscillate in an arcuate path about a substantially horizontal axis, a weight carried by the pendulum adjacent one end thereof for holding said pendulum substantially vertical, a rest carried by the base plate and extending outwardly therefrom into the arcuate path for engaging the weight and holding the pendulum substantially parallel to the plate, a contact carried by the pendulum and extending outwardly therefrom adjacent the end thereof remote from the weight for movement with the pendulum in an arcuate path, a bracket of non-conducting material carried by the plate and extending outwardly therefrom adjacent the opening, and a terminal screw carried by the bracket and extending outwardly therefrom into the path of movement of the contact on the pendulum.

References Cited in the file of this patent

UNITED STATES PATENTS

| Number | Name | Date |
| --- | --- | --- |
| 1,713,191 | Penfold | May 14, 1929 |